(12) United States Patent
Kang et al.

(10) Patent No.: US 11,837,733 B2
(45) Date of Patent: Dec. 5, 2023

(54) SUB-NANOMETRIC PARTICLES-METAL ORGANIC FRAMEWORK COMPLEX INCLUDING MULTI-SHELL HOLLOW METAL ORGANIC FRAMEWORK AND SUBNANOMETRIC PARTICLES

(71) Applicant: KOREA ADVANCED INSTITUTE OF SCIENCE AND TECHNOLOGY, Daejeon (KR)

(72) Inventors: Jeung Ku Kang, Daejeon (KR); Won Ho Choi, Daejeon (KR); Byeong Cheul Moon, Daejeon (KR); Dong Gyu Park, Daejeon (KR); Jae Won Choi, Daejeon (KR); Keon-Han Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 141 days.

(21) Appl. No.: 17/229,594

(22) Filed: Apr. 13, 2021

(65) Prior Publication Data
US 2021/0384522 A1 Dec. 9, 2021

(30) Foreign Application Priority Data

Jun. 3, 2020 (KR) .................. 10-2020-0067112

(51) Int. Cl.
*H01M 4/90* (2006.01)
*H01G 11/30* (2013.01)
*H01M 12/08* (2006.01)
*H01M 4/86* (2006.01)

(52) U.S. Cl.
CPC .......... *H01M 4/9008* (2013.01); *H01G 11/30* (2013.01); *H01M 4/9016* (2013.01); *H01M 12/08* (2013.01); *H01M 2004/8689* (2013.01)

(58) Field of Classification Search
CPC .. H01M 4/9008; H01M 4/9016; H01M 12/08; H01M 2004/8689; H01M 4/62; H01M 4/8663; H01G 11/30; H01G 11/26; H01G 11/70; B82Y 30/00; Y02E 60/10; Y02E 60/36; C25B 11/075; C25B 1/04; B01J 31/1691; B01J 35/0006; B01J 35/0013; B01J 35/0033; B01J 35/026; B01J 37/0203; B01J 2231/62; B01J 2523/00; B01J 2523/845; C07F 3/06; C07F 15/06
See application file for complete search history.

(56) References Cited

FOREIGN PATENT DOCUMENTS

KR 10-2016-0049856 A 5/2016

OTHER PUBLICATIONS

Hu et al., Core-shell MOF-derived N-doped yolk-shell carbon nanocages homogenously filled with ZnSe and CoSe2 nanodots as excellent anode materials for lithium- and sodium-ion batteries, J. Mater. Chem. A, 7, 11016-11037 (Year: 2015).*

(Continued)

*Primary Examiner* — Daniel S Gatewood
(74) *Attorney, Agent, or Firm* — GREENBERG TRAURIG, LLP

(57) ABSTRACT

The present disclosure relates to a sub-nanometric particles-metal organic framework complex including a multi-shell hollow metal organic framework (MOF) and sub-nanometric particles (SNPs), and a method of preparing the same.

13 Claims, 19 Drawing Sheets

(56) References Cited

OTHER PUBLICATIONS

Lei et al., Noncovalent Immobilization of a Pyrene-Modified Cobalt Corrole on Carbon Supports for Enhanced Electrocatalytic Oxygen Reduction and Oxygen Evolution in Aqueous Solutions, ACS Catal., 6, 6429-6437 (Year: 2016).*
Park et al., Cation-Dependent Intrinsic Electrical Conductivity in Isostructural Tetrathiafulvalene-Based Microporous Metal-Organic Frameworks, J. Am. Chem. Soc., 137, 1774-1777 (Year: 2015).*
Won Ho Choi, et al.; "Autogenous Production and Stabilization of Highly Loaded Sub-Nanometric Particles within Multishell Hollow Metal-Organic Frameworks and Their Utilization for High Performance in Li—O2 Batteries"; Advanced Science; Wiley-VCH Verlag GmbH & Co. KGaA, Weinheim; 2020, (2000283), 9 pages.

* cited by examiner

SUB-NANOMETRIC PARTICLES-METAL ORGANIC FRAMEWORK COMPLEX INCLUDING MULTI-SHELL HOLLOW METAL ORGANIC FRAMEWORK AND SUBNANOMETRIC PARTICLES

CROSS-REFERENCE TO RELATED APPLICATION

This application claims the benefit under 35 USC 119(a) of Korean Patent Applications No. 10-2020-0067112 filed on Jun. 3, 2020 in the Korean Intellectual Property Office, the entire disclosures of which are incorporated herein by reference for all purposes.

TECHNICAL FIELD

The present disclosure relates to a sub-nanometric particles-metal organic framework complex including a multi-shell hollow metal organic framework (MOF) and sub-nanometric particles (SNPs), and a method of preparing the same.

BACKGROUND

As environmental concerns have become more prominent, environment-friendly vehicles such as electric vehicles have recently gained increasing attention to reducing pollution and $CO_2$ emissions. So far, most electric vehicles have an expected travel range of just 300 km with one charging. The limited travel range of electric vehicles is caused by an insufficient capacity of a lithium ion secondary battery used for storing electric energy. In fact, continuous efforts have been made for decades. Much has been done to increase the lithium ion secondary battery capacity, which is, however, somewhat at the limit according to the currently dominant opinion. To solve this problem, next-generation secondary battery systems have been researched, and particularly, a lithium-air secondary battery has been evaluated as having the largest capacity. The lithium-air secondary battery uses air (oxygen) as a positive active material and thus can have a capacity several times higher than a lithium ion secondary battery that uses a heavy transition metal oxide.

However, although there has been an effort to improve the performance of carbon in an air electrode (positive electrode) of a conventional lithium-air secondary battery (Korean Patent Laid-open Publication. No. 10-2016-0049856), there is no attempt to increase active sites and the amount of loaded nanometric particles serving as a catalyst. Therefore, lithium-air secondary batteries have not achieved a remarkably improved performance.

SUMMARY

The present disclosure provides a sub-nanometric particles-metal organic framework (MOF) complex including a multi-shell hollow MOF and sub-nanometric particles (SNPs) with increased active sites and increased amount of loaded sub-nanometric particles.

However, the problems to be solved by the present disclosure are not limited to the above-described problems. Although not described herein, other problems to be solved by the present disclosure can be clearly understood by a person with ordinary skill in the art from the following descriptions.

A first aspect of the present disclosure provides a sub-nanometric particles-metal organic framework (MOF) complex including a hollow MOF and sub-nanometric particles (SNPs), and the SNPs are embedded in pores of the hollow MOF.

A second aspect of the present disclosure provides a method of preparing a sub-nanometric particles-MOF complex, including: forming a multilayer hollow MOF by alternately stacking a water-stable MOF and a water-decomposable MOF; adding a complex of water and a compound that includes a functional group capable of forming at least two hydrogen bonds; and embedding SNPs in pores of the water-stable MOF when the water-decomposable MOF is decomposed.

A third aspect of the present disclosure provides an energy device including a sub-nanometric particles-MOF complex according to the first aspect.

The sub-nanometric particles-MOF complex according to embodiments of the present disclosure includes a multi-shell MOF and the SNPs loaded in pores of the MOF. Therefore, more active sites are provided, and the amount of the loaded SNPs is remarkably increased, compared to a pure MOF.

According to the embodiments of the present disclosure, a multi-shell hollow MOF stabilizes mononuclear or dinuclear SNPs by n-backbonding, and the SNPs transport electrons through the hopping transport mechanism, and, thus, the sub-nanometric particles-MOF complex of the present disclosure can achieve high conductivity and minimize transport resistance due to hollow interspaces.

In the method of preparing a sub-nanometric particles-MOF complex according to an embodiment of the present disclosure, the multilayer hollow MOF and the complex of water and a compound that includes a functional group capable of forming at least two hydrogen bonds are used, and, thus, the mononuclear or dinuclear SNPs can be autogenously produced by the controlled transfer of isolated water molecules, and a large number of SNPs can be loaded in the pores of the water-stable MOF.

If the sub-nanometric particles-MOF complex according to the embodiments of the present disclosure is applied to an energy device, specifically, for example, an air electrode of a lithium-air battery, it can provide a large capacity, a low overvoltage and a long-term cycling stability and thus provide high electrochemical performance to the lithium-air battery.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
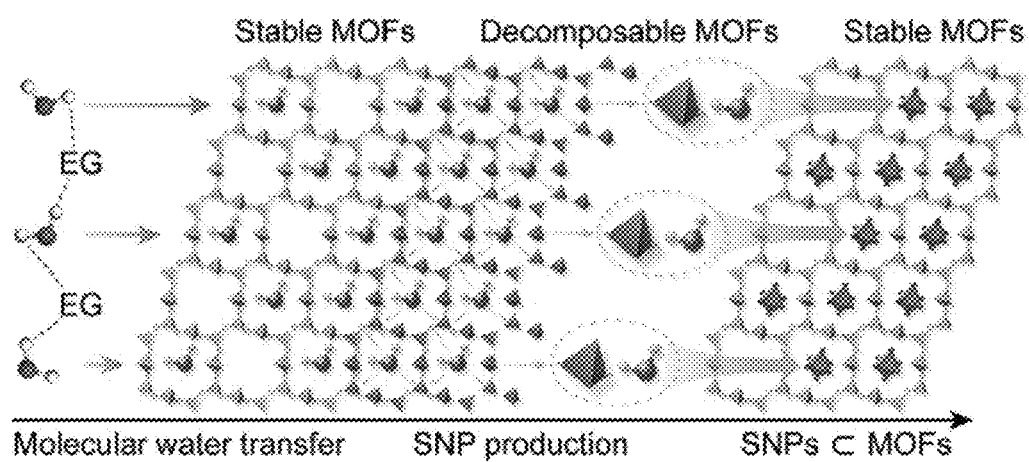
FIG. 1 is a schematic diagram illustrating a strategy for the synthesis of a sub-nanometric particles-MOF complex according to an embodiment of the present disclosure.

Through the whole document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for."

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "sub-nanometric particles" refers to "particles 1 nm or less in diameter" with which new structures, materials, machines, instruments and elements can be fabricated by manipulating molecules or atoms.

Hereinafter, embodiments and examples of the present disclosure will be described in detail with reference to the accompanying drawings. However, the present disclosure is not limited to these embodiments, examples and drawings.

A first aspect of the present disclosure provides a sub-nanometric particles-metal organic framework (MOF) complex including a hollow MOF and sub-nanometric particles (SNPs), and the SNPs are embedded in pores of the hollow MOF.

In an embodiment of the present disclosure, the hollow MOF may include one or more MOF shells. Specifically, the sub-nanometric particles-MOF complex includes a multi-shell MOF and the SNPs loaded in pores of the MOF. Therefore, more active sites are provided, and the amount of the loaded SNPs is remarkably increased, compared to a pure MOF.

In an embodiment of the present disclosure, the number of the MOF shells may be 1 to 10. Specifically, the number of the MOF shells may be 1 to 10, 1 to 8, 1 to 6, 1 to 5, or 1 to 4. The number of the MOF shells can be infinite in theory. However, considering practical implementation, 1 to 10 shells can be implemented, and considering process efficiency, desirably 1 to 5 shells may be implemented.

In an embodiment of the present disclosure, the hollow MOF may stabilize the SNPs by π-backbonding.

In an embodiment of the present disclosure, the SNPs may transport electrons through hopping transport mechanism.

In an embodiment of the present disclosure, the SNPs may be mononuclear SNPs or dinuclear SNPs. Specifically, the SNPs embedded in pores of a multi-shell hollow MOF are not in the form of agglomeration of metals, but may be mononuclear or dinuclear materials. The multi-shell hollow MOF can stabilize mononuclear or dinuclear SNPs by n-backbonding, and the SNPs can transport electrons through the hopping transport mechanism, and, thus, the sub-nanometric particles-MOF complex of the present disclosure can achieve high conductivity and hollow interspaces can minimize the diffusion speed due to short diffusion length (the diffusion speed is proportional to the square of the diffusion length).

In an embodiment of the present disclosure, the hollow MOF may include at least one selected from ZIF-8, ZIF-67, MOF-74, MIL-100, UIO-66 and MOF-867, but is not limited thereto.

In an embodiment of the present disclosure, the SNPs may include at least one selected from Mg, Ca, Sr, Ba, Mn, Fe, Co, Ni, Zn, and Cd, but is not limited thereto.

In an embodiment of the present disclosure, the SNPs may be contained in an amount of 0.001 part by weight to 20 parts by weight with respect to 100 parts by weight of the sub-nanometric particles-MOF complex. Specifically, the SNPs may be contained in an amount of 0.001 part by weight to 20 parts by weight, 0.01 part by weight to 20 parts by weight, 0.1 part by weight to 20 parts by weight, 1 part by weight to 20 parts by weight, 2 parts by weight to 20 parts by weight, 5 parts by weight to 20 parts by weight, 10 parts by weight to 20 parts by weight, 0.001 part by weight to 15 parts by weight, 0.001 part by weight to 10 parts by weight, 0.01 part by weight to 10 parts by weight, 0.1 part by weight to 10 parts by weight, or 1 part by weight to 10 parts by weight with respect to 100 parts by weight of the sub-nanometric particles-MOF complex. The SNPs are not in the form of agglomeration of metals, but may be mononuclear or dinuclear materials and do not fill the entire space of pores. Therefore, the SNPs may be contained in an amount of 0.001 part by weight to 20 parts by weight. If the SNPs are contained more than 20 parts by weight, the metals may excessively agglomerate, and, thus, the amount of metals used is excessively increased and hopping conduction may be reduced. Further, if the SNPs are contained less than 0.001 part by weight, hopping conduction may be reduced and the function as a catalyst may deteriorate.

A second aspect of the present disclosure provides a method of preparing a sub-nanometric particles-MOF complex, including: forming a multilayer hollow MOF by alternately stacking a water-stable MOF and a water-decomposable MOF; adding a complex of water and a compound that includes a functional group capable of forming at least two hydrogen bonds; and embedding SNPs in pores of the water-stable MOF when the water-decomposable MOF is decomposed.

In an embodiment of the present disclosure, the SNPs may be metals contained in the water-decomposable MOF. Specifically, by adding the complex of water and a compound that includes a functional group capable of forming at least two hydrogen bonds, single water molecules can be provided to the water-decomposable MOF. Then, the water-decomposable MOF is decomposed to produce SNPs (metal). The SNPs produced as described above are embedded in the pores of the water-stable MOF. Therefore, mononuclear or dinuclear SNPs are autogenously produced.

In an embodiment of the present disclosure, water molecules may be isolated from the complex of water and a compound that includes a functional group capable of forming at least two hydrogen bonds through the water-stable MOF, and the water molecules may be transported to the water-decomposable MOF. Specifically, the high hydrogen bonding affinity between the compound that includes a functional group capable of forming at least two hydrogen bonds and the water molecules can be used to isolate each water molecule and thus block the formation of water clusters and also regulate the controlled formation of SNPs. Further, owing to their hydrophobicity, the water-stable MOF layers can transfer the water molecules to the water-decomposable MOF layers without adsorption of water molecules.

In a conventional technology, SNPs different from each other in size are mass-produced by supplying a large amount of water (water clusters). Thus, as agglomeration is driven by surface energy differences attributed to different particle sizes, the SNPs also grow to become larger particles. However, in the preparation method according to the present disclosure, single water molecules in a controlled state are provided to the water-decomposable MOF through the complex of water and a compound that includes a functional group capable of forming at least two hydrogen bonds, and, thus, mononuclear or dinuclear SNPs uniform in size can be prepared. The single water molecules are smaller in size than an aperture of the water-stable MOF and thus can pass through the water-stable MOF and thus can be provided to the water-decomposable MOF. Also, SNPs produced by decomposition of the water-decomposable MOF are larger than the aperture of the water-stable MOF and thus can be embedded in the pores of the water-stable MOF.

In an embodiment of the present disclosure, the water-stable MOF and the water-decomposable MOF may be alternately stacked using an organic linker. Specifically, the organic linker may be an imidazole-based linker including 2-methylimidazole (2-mim) or the like, but is not limited thereto.

A strategy for the synthesis of a sub-nanometric particles-MOF complex according to an embodiment of the present disclosure can be seen with reference to FIG. 1. Specifically, an ethylene glycol-water complex is added to a multilayer MOF in which the water-stable MOF and the water-decomposable MOF are alternately stacked using the organic linker, and, thus, single water molecules in a controlled state can be provided to the water-decomposable MOF. Accordingly, the water-decomposable MOF is decomposed and metals produced therefrom form mononuclear or dinuclear SNPs uniform in size and are located in micropores of the water-stable MOF.

In an embodiment of the present disclosure, each of the water-stable MOF and the water-decomposable MOF may be alternately stacked to 1 layer to 10 layers.

In an embodiment of the present disclosure, the compound that includes a functional group capable of forming at least two hydrogen bonds may include at least one selected from ethylene glycol, diethylene glycol, propylene glycol, polyalcohol including butanediol or pentanediol, ascorbic acid, glycine, di-malic acid, methylene diamine, ethylene diamine, trimethylene diamine, tetramethylene diamine and pentamethylene diamine, but is not limited thereto.

In an embodiment of the present disclosure, the addition of the complex of water and a compound that includes a functional group capable of forming at least two hydrogen bonds may suppress supersaturation of the water-decomposable MOF and enable the SNPs to form mononuclear or dinuclear SNPs. Specifically, the addition of the complex of water and a compound that includes a functional group capable of forming at least two hydrogen bonds may enable single water molecules to come into contact with the water-decomposable MOF to suppress supersaturation of the water-decomposable MOF and thus avoid rapid nucleation. This approach makes hydrolysis controllable by regulating molecular water transfer and effectively suppresses bulk nucleation, which enables a high mass of uniform SNPs to be loaded in the pores of the water-stable MOF.

A third aspect of the present disclosure provides an energy device including a sub-nanometric particles-MOF complex according to the first aspect.

In an embodiment of the present disclosure, the energy device may include a lithium-air battery, a lithium-ion battery, a supercapacitor, a hydrolysis electrocatalyst or an electrocatalyst for oxygen reduction reaction, but is not limited thereto.

In an embodiment of the present disclosure, the sub-nanometric particles-MOF complex may have an improved catalytic activity by increasing the number of active sites or an increase in the amount of the loaded SNPs, compared to a pure MOF, or by expression of both of them. Specifically, the sub-nanometric particles-MOF complex includes a multi-shell MOF and SNPs loaded in pores of the MOF, and, thus, if the sub-nanometric particles-MOF complex is applied to an air electrode (positive electrode) of a lithium-air battery, it can provide a large capacity and a low overvoltage. Therefore, electrochemical performance of the lithium-air battery can be improved. More specifically, the sub-nanometric particles-MOF complex can remarkably improve an overpotential for an oxygen evolution reaction (OER) upon charging of the lithium-air battery and also help to decompose $Li_2O_2$ efficiently. Further, it can provide a large surface area for the accumulation of $Li_2O_2$ in an oxygen reduction reaction (ORR) upon discharging. Furthermore, in the sub-nanometric particles-MOF complex, the SNPs are stabilized by n-backbonding and thus have excellent cycling stability.

Detailed descriptions of the first to third aspects of the present disclosure, which overlap with each other, may be identically applied to the first to third aspects of the present disclosure, even though they are omitted hereinafter.

Hereinafter, the present disclosure will be described in more detail with reference to examples, but the present disclosure is not limited thereto.

EXAMPLE

Example 1

Preparation of Sub-Nanometric Particles-Embedded Multi-Shell Hollow Metal-Organic Framework (MOF)

1-1. Preparation of multilayer MOF (ML-ZIFs [nL])

A multilayer MOF (ML-ZIFs [nL]) was prepared by selecting zeolitic imidazolate framework-8 (ZIF-8) and zeolitic imidazolate framework-67 (ZIF-67) as a water-stable MOF and a water-decomposable MOF.

First, precursor solutions of $95 \times 10^{-3}$ M $Co(NO_3)_2$ in deionized water and $800 \times 10^{-3}$ M 2-methylimidazole (2-mim), $30 \times 10^{-3}$ M $Zn(NO_3)_2$, and $30 \times 10^{-3}$ M 2-mim in methanol were prepared. Then, 5 g of polyvinylpyrrolidone (PVP) was mixed with 200 mL of methanol. All solutions were sonicated for 30 minutes and cooled to room temperature. Thereafter, to prepare ZIF-67 seeds, 3.3 mL of the $800 \times 10^{-3}$ M 2-mim solution and 3.9 mL of the PVP solution were transferred into a 50 mL conical tube and then mixed with 1.5 mL of the $95 \times 10^{-3}$ M $Co(NO_3)_2$ solution. The mixture immediately turned purple and was kept for 1 hour at room temperature. Subsequently, the purple solution was centrifuged at 8,500 rpm for 10 minutes. To prepare ML-ZIFs [2L], 7.5 mL of the $30 \times 10^{-3}$ M 2-mim solution was added to the collected purple powder in a conical tube. The mixture was sonicated for 10 minutes and then mixed with 7.5 mL of the $30 \times 10^{-3}$ M $Zn(NO_3)_2$ solution. After being kept for 3 hours at room temperature, the precipitate was collected by centrifugation at 600 rpm for 10 minutes and then washed with methanol three times. A new conical tube was used for every step.

Finally, ML-ZIFs [nL] was prepared via the following steps. Initially, 3 mL of the $800 \times 10^{-3}$ M 2-mim solution (4 mL for the subsequent layer-stacking processes), freshly prepared in methanol, was added to the ML-ZIFs [2L, 4L, 6L, or 8L] powder in a conical tube. The mixture was sonicated for 5 minutes to achieve dispersion, and then 0.75 mL of the $95 \times 10^{-3}$ M $Co(NO_3)_2$ solution was added. After 30 minutes, the solution was centrifuged at 8,500 rpm for 10 minutes, 12.5 mL of the $30 \times 10^{-3}$ M 2-mim solution was added, and the mixture was sonicated for 5 minutes. Then, 12.5 mL of the $30 \times 10^{-3}$ M $Zn(NO_3)_2$ solution was added and the mixture was kept for 3 hours. The above-described process was repeated every time two new layers of ML-ZIFs [2 L] were stacked.

1-2. Transformation to Multi-Shell Hollow MOF (H-ZIF-8 [nS])

First, 760 mL of pure ethylene glycol (EG) (stored at −15° C. in the refrigerator) was transferred into a 1 L HDPE Nalgene bottle. Then, 40 mL of deionized water was added and the solution was sonicated for 10 minutes. Subsequently, 100 mg of as-synthesized ML-ZIFs [nL] was mixed with the EGwater solution. The mixture was sonicated for 6 hours at 5° C. until a transparent purple solution was obtained. The solution was transferred into a 1 L round-bottom flask and stirred at room temperature for 6 hours, and the resulting mixture was filtered using a membrane filter. The powder on the membrane was collected by sonication in methanol. Following centrifugation at 6,000 rpm for 10 minutes, the powder was washed with methanol three times. Finally, the collected powder was dried in a vacuum oven at 60° C. for 24 hours to prepare a multi-shell MOF (H-ZIF-8 [nS]).

Test Example 1

Confirmation of Transformation to Multi-Shell Hollow MOF

Figure 2A:
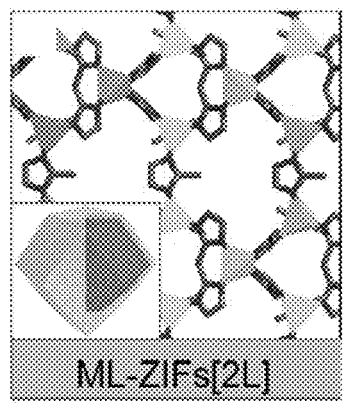
FIG. 2A shows an illustration of the inside of multilayer MOFs (ML-ZIFs [nL]) (green: Zn, violet: Co) according to an example of the present disclosure.

The X-ray diffraction (XRD) patterns of ZIF-67 after hydrolysis and the unchanged XRD patterns of ZIF-8 demonstrated that all the metal complexes in ZIF-67 were disconnected from the organic linkers when exposed to water. ZIF-67, which is isostructural with ZIF-8 because the both MOFs are composed of 2-methylimidazole (2-mim), was first seeded for the epitaxial growth of ZIF-8 to construct multilayer ZIFs (ML-ZIFs [nL], where n is the number of layers) (FIG. 2A).

Figure 2B:
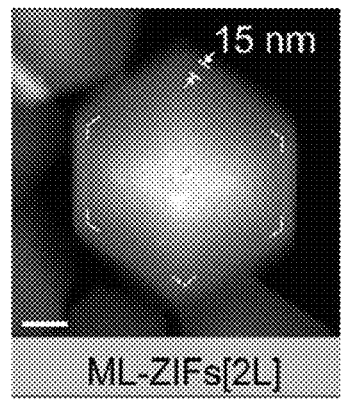
FIG. 2B shows a HAADF-STEM image of multilayer MOFs (ML-ZIFs [nL]) according to an example of the present disclosure (scale bar is 50 nm).
Figure 2C:
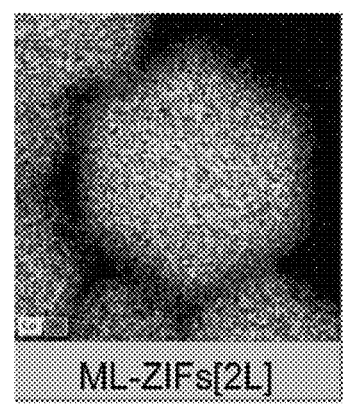
FIG. 2C shows a elemental mapping image of multilayer MOFs (ML-ZIFs [nL]) according to an example of the present disclosure (scale bar is 50 nm).
Figure 3A:
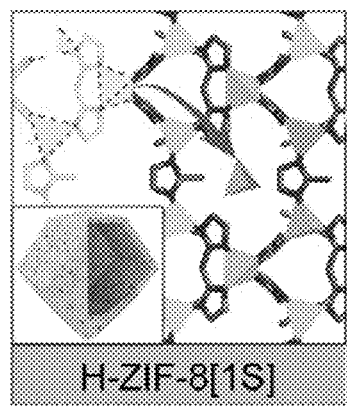
FIG. 3A shows an illustration of the inside of multi-shell MOFs (H-ZIF-8 [nS]) (green: Zn, violet: Co) according to an example of the present disclosure.
Figure 3B:
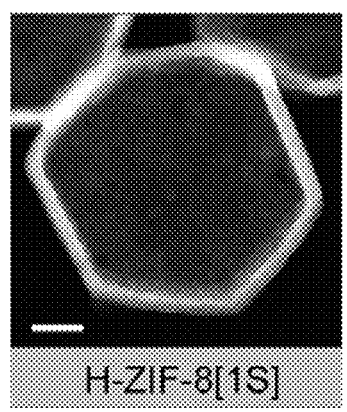
FIG. 3B shows a HAADF-STEM image of multi-shell MOFs (H-ZIF-8 [nS]) according to an example of the present disclosure (scale bar is 50 nm).
Figure 3C:
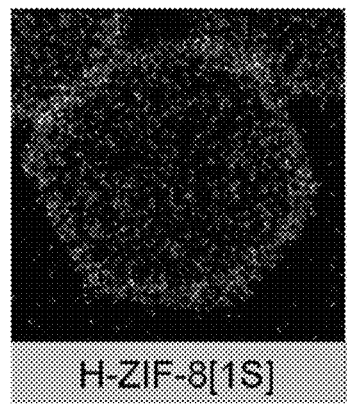
FIG. 3C shows a elemental mapping image of multi-shell MOFs (H-ZIF-8 [nS]) according to an example of the present disclosure (scale bar is 50 nm).
Figure 4A:
FIGS. 4A-4D show TEM images of 2S (FIG. 4A), 3S (FIG. 4B), 4S (FIG. 4C) and 5S (FIG. 4D) of the multi-shell MOFs (H-ZIF-8 [nS]) (all scale bars are 50 nm) according to an example of the present disclosure.
Figure 4B:
Figure 4C:
Figure 4D:

In FIG. 2, the boundary between ZIF-67 and ZIF-8 is indicated by the dotted line in the high-angle annular dark-field scanning transmission electron microscopy (HAADF-STEM) image (FIG. 2B) and by the distinct colors corresponding to Co in ZIF-67 and Zn in ZIF-8 revealed by the energy-dispersive X-ray spectroscopy (EDX) (FIG. 2C). FIG. 3A shows that ML-ZIFs[nL] was transformed into sub-nanometric particles (SNPs)-embedded multi-shell hollow ZIF-8 (H-ZIF-8[nS], where n is the number of shells). The disassembly of the bonds between the Co ions and 2-mim in ZIF-67 generates SNP precursors and interspaces, as identified by the elemental mapping and HAADF-STEM images (FIG. 3B and FIG. 3C). The line profiling analysis clarifies that the Co species migrated into the ZIF-8 shell. The inductively coupled plasma optical emission spectroscopy (ICP-OES) and EDX analyses show that H-ZIF-8 [1S] has a Co content of 10.4 wt %, indicating that the water-decomposable MOFs allow the high mass loading of Co particles in the water-stable MOFs.

Moreover, the transmission electron microscopy (TEM) images (FIG. 4A to FIG. 4D) demonstrate that H-ZIF-8 [2S, 3S, 4S, 5S] are created after sieving EG-water complexes through ML-ZIFs [4L, 6L, 8L, 10L]. These results reveal that multi-shell hollow MOFs could be produced via the controlled transfer of isolated water molecules from EG-water complexes through multilayer MOFs.

Test Example 2

Check of Chemical State of SNP Stacked in Water-Stable MOF

Figure 5:
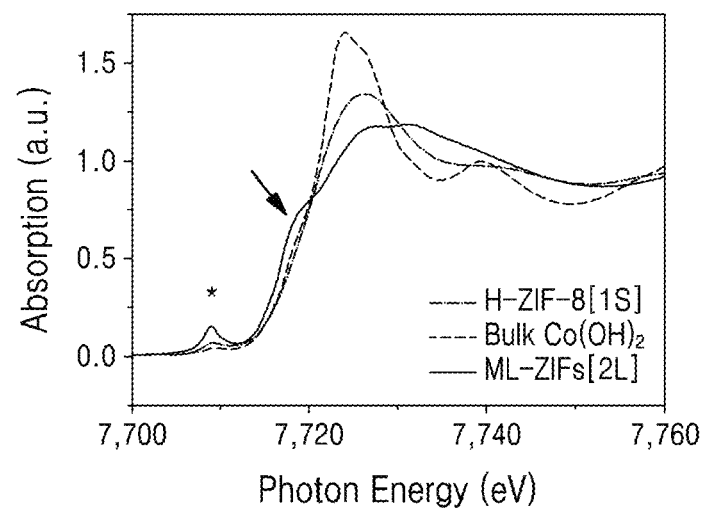
FIG. 5 is a graph showing normalized Co K-edge XANES spectra of $Co(OH)_2$ SNPs according to an example of the present disclosure.

To elucidate the chemical state of Co SNPs in the ZIF-8 shell, the X-ray photoelectron spectroscopy (XPS) measurements were conducted. No Co 2p characteristics were observed in ML-ZIFs [2L], but the XPS peaks of H-ZIF-8 [1S] confirmed the existence of divalent Co atoms comparable to those in bulk $Co(OH)_2$. To further clarify the different structures of ML-ZIFs [2L] and H-ZIF-8 [1S], the Co K-edge X-ray absorption near-edge structure (XANES) spectra were collected (FIG. 5). First, the pre-edge feature of H-ZIF-8 [1S], marked by * around 7,709 eV, was significantly reduced. Second, the shoulder absorption edge caused by the partially localized excitation of Co—N bonds disappeared, as indicated by an arrow around 7,720 eV. Finally, the prominent absorption peak shifted to higher photon energy. The pre-edge peak of ML-ZIFs [2L] corresponds to the 1s-3d electric dipole forbidden transition originating from tetrahedrally coordinated Co in ZIF-67, whereas that of bulk $Co(OH)_2$ becomes almost flat with the formation of centrosymmetric edge-shared $CoO_6$ octahedra. Thus, the geometric transformation from ML-ZIFs [2L] to H-ZIF-8 [1S] results in a transition of Co coordination from tetrahedral to distorted octahedral, attributable to 3d-4p orbital mixing initiated by the slightly tilted centrosymmetric coordination. Moreover, Co atoms were more oxidized through the formation of Co—O bonds, thereby enhancing the 1s-4p transition on backscattering induced by the structural transformation, resulting in the disappeared shoulder edge and higher energy shift. The red area in the 2D contour map indicates the formation of a higher oxidation state after the structural transformation of ML-ZIFs [2L] to H-ZIF-8 [1S].

Figure 6:
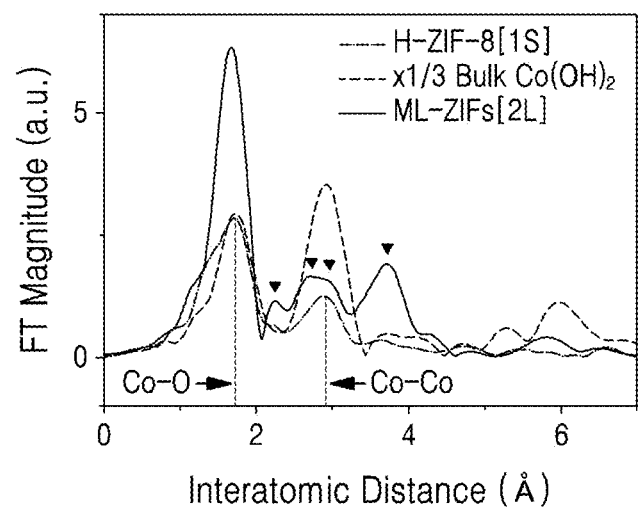
FIG. 6 is a graph showing a radial distribution function obtained by the Fourier transformation of $k^3$-weighted Co EXAFS spectra of $Co(OH)_2$ SNPs according to an example of the present disclosure.
Figure 7:
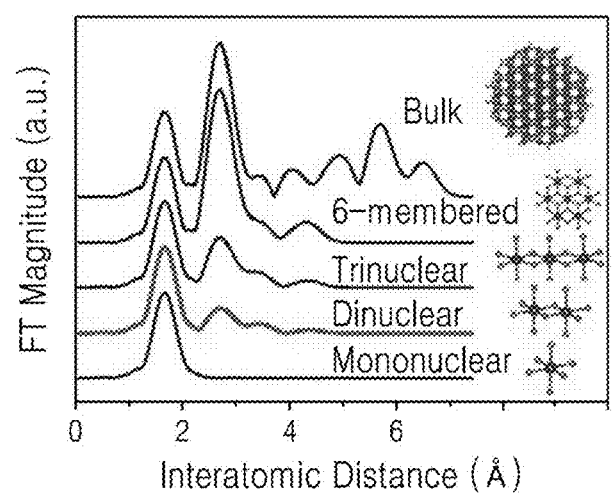
FIG. 7 is a graph showing Co K-edge EXAFS simulation curves with $Co(OH)_2$ size obtained by back Fourier transformation of the radial structural function according to an example of the present disclosure.

The coordination environment of Co was explored using the K-edge extended X-ray absorption fine structure (EX-AFS) spectroscopy (FIG. 6). The prominent peak of ML-ZIFs [2L] at 1.65 A is attributable to Co—N bonds and the peaks at 2.23 A, 2.67 A, 2.94 A and 3.71 A correspond to 2-mim. However, H-ZIF-8 [1S] has two peaks corresponding to Co—OH bonds at 1.70 A, as supported by the IR and XPS spectra, and to oxygen edge-sharing Co—Co bonds at 2.90 A. The changes in the coordination environment during the transformation of ML-ZIFs [2L] to H-ZIF-8 [1S] could be confirmed by the disappearance of the 2-mim signals and the appearance of only two peaks. The Co—Co peak is significantly weaker than the Co—OH peak, which indicates the existence of atomic particles. In the Co K-edge simulation curves (FIG. 7), the ratio between Co—OH peak and Co—Co peak demonstrated that Co(OH)2 is dinuclear in H-ZIF-8 [1S]. The XANES and EXAFS spectra verified that Zn is not affected in the process. Although not indicated in the drawings, it was confirmed that mononuclear SNPs were also formed.

These results were consistent with the effective disconnection of all the coordinate bonds of ZIF-67 and the generation of dinuclear $Co(OH)_2$ SNPs inside the micropores of H-ZIF-8 [nS]. In addition, the "disordered-to-crystalline" phenomenon occurs upon exposure of SNPs to an electron beam and involves crystallization of SNPs in micropores caused by agglomeration of more than a certain number of atoms due to high energy, thereby corroborating the existence of SNPs inside the multi-shell hollow MOFs.

Test Example 3

Confirmation of Role of Micropore in Multi-Shell Hollow MOF

Figure 8:
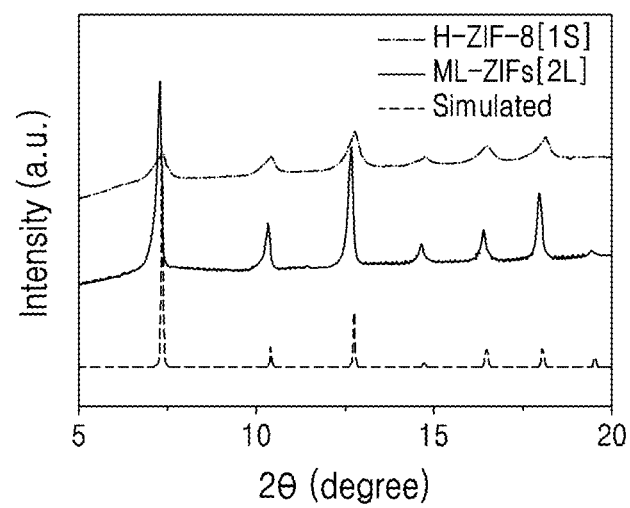
FIG. 8 is a graph showing XRD patterns of pristine ZIF-8 according to an example of the present disclosure.
Figure 9:
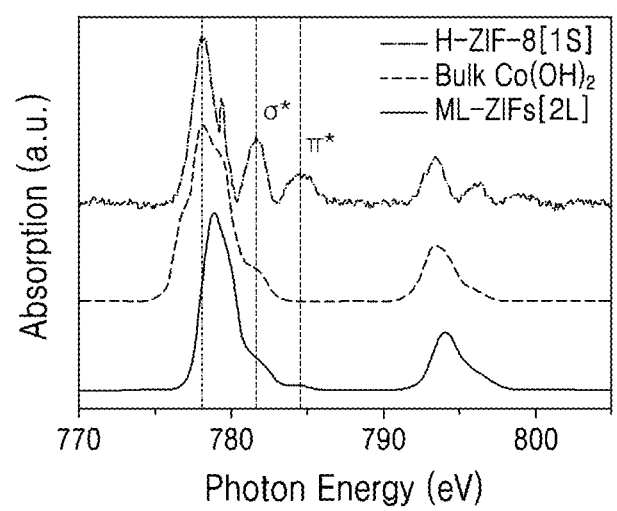
FIG. 9 is a graph showing normalized Co L-edge NEXAFS spectra of $Co(OH)_2$ SNPs according to an example of the present disclosure.
Figure 10:
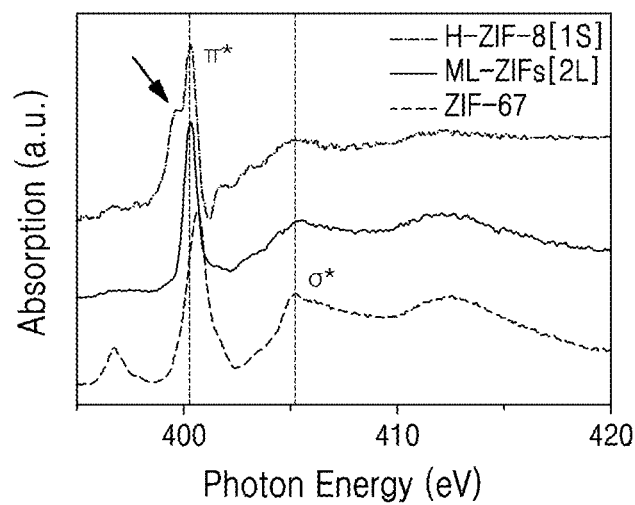
FIG. 10 is a graph showing normalized N K-edge NEXAFS spectra of $Co(OH)_2$ SNPs according to an example of the present disclosure.
Figure 11:
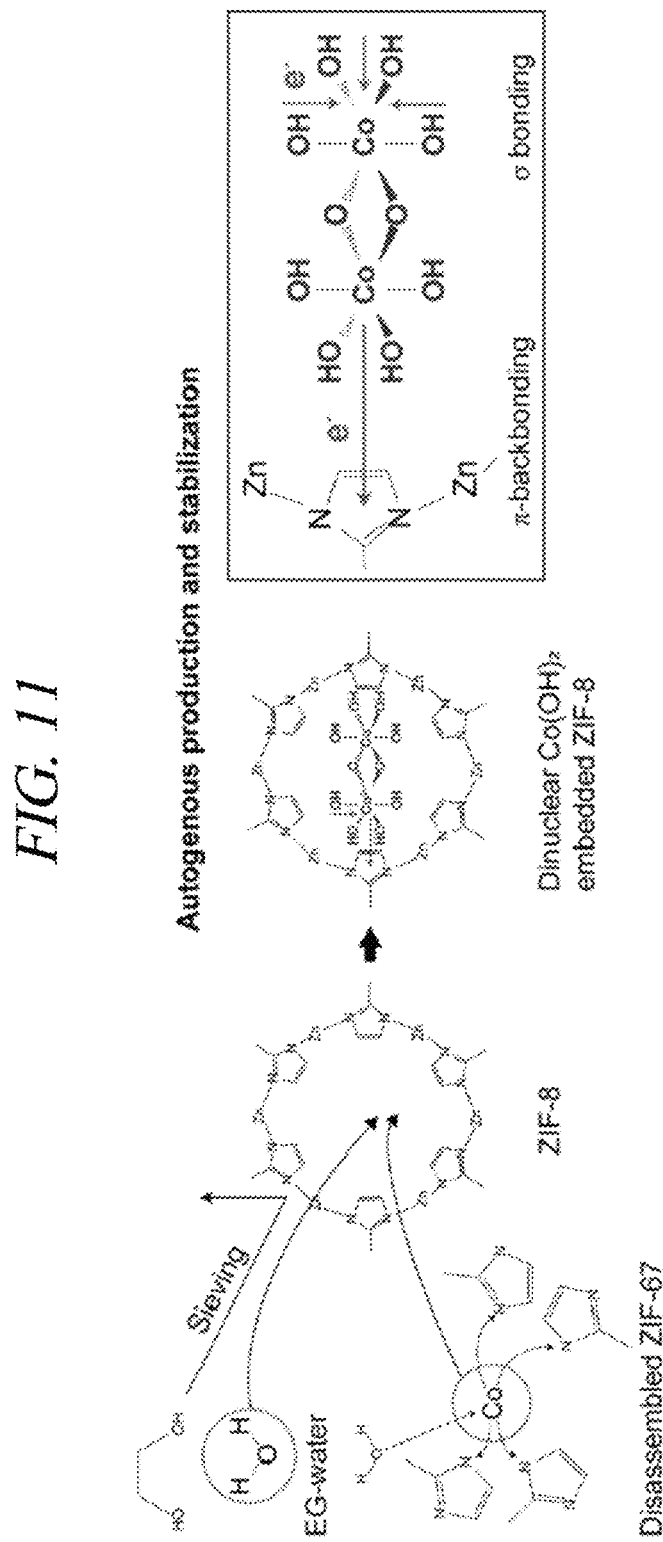
FIG. 11 is a schematic diagram illustrating the autogenous production and stabilization of $Co(OH)_2$ SNPs in a micropore according to an example of the present disclosure.

The role of each micropore was also confirmed by the changes in the physical and chemical properties of H-ZIF-8 [1S]. The XRD patterns of ZIF-8 agree with the simulated patterns of H-ZIF-8 [nS] at diffraction angles lower than 20° (FIG. 8). However, the peaks associated with the {011} facets shift toward higher angles and exhibit reduced intensities. The scanning electron microscopy (SEM) images reveal that ZIF-8 has a rhombic dodecahedron morphology with exposed {011} facets that form 1.1 nm micropores connected to 0.34 nm apertures. The micropore is induced by the {011} facets allowing the passage of only a single water molecule. Thus, the formation of $Co(OH)_2$ SNPs in micropores results in a shift to higher angles owing to the slightly reduced pore sizes, with the reduced intensities for the {011} facets. The decreased pore volumes and pore sizes in the Brunauer-Emmett-Teller (BET) isotherms as well as the pore size distribution curves also indicate the micropore filling by the $Co(OH)_2$ SN Ps. The near-edge X-ray absorption fine structure (NEXAFS) spectra showed a changed dipole transition from core electrons to unoccupied molecular orbitals caused by the micropore filling. The trigonal or tetragonal distortions of octahedral bulk $Co(OH)_2$ led to $t_{2g}$ and $e_g$ orbital splitting, as represented by Co $L_{2,3}$-edge multiplets (FIG. 9). This splitting completely disappeared at 776.9 eV and 779.7 eV in the H-ZIF-8 [1S] spectrum, but a dominant dipole transition at 778.1 eV, which is related to the polarized orbital occupation resulting from the spatial strain in confined spaces was observed. Interestingly, a narrow, strong peak at 779.4 eV was observed owing to the transition of more oxidized $Co^{3+}$ ($t_{2g}^6$ $e_g^0$, low-spin) to the higher energy $e_g$ orbital, which is distinguishable from $Co^{2+}$($t_{2g}^5$ $e_g^2$, high-spin). The blue-shifted IR spectrum supports the presence of $Co^{3+}$ in H-ZIF-8 [1S]. The electron-deficient $Co^{3+}$ strongly attracts hydroxyl group lone pair electrons to fill the completely empty orbitals, as confirmed by the strong σ* transition at 781.7 eV. The enriched σ bonds also result in shorter bond lengths (FIG. 6), as indicated by the shoulder below 1.70 Å. Generally, the donor atoms involved in σ bonds become more electropositive, thereby allowing n-backbonding from the completely filled metallic $t_{2g}$ orbital to the empty π* orbital of the donor atom. Commonly, π-backbonding occurs between transition metals and organic ligands, but the predominant π* transition at 784.8 eV for H-ZIF-8 [15] indicates an increase in n-backbonding not observed in bulk $Co(OH)_2$ and ML-ZIFs [2L]. The N K-edge NEXAFS spectrum of H-ZIF-8 [15] (FIG. 10) shows a split π* transition, which is typically observed in extended π-π* systems, with n orbitals accessible to the K-edge excited electrons at 400.3 eV and 399.7 eV (marked by arrows). Imidazole rings are stronger π-acceptors than hydroxyl groups, so that the −0.7 eV shift of the π* transition is derived from the increased electron density resulting from π-backbonding by the surrounding $Co(OH)_2$ SNPs. Furthermore, preferential π-backbonding between $Co(OH)_2$ SNPs and 2-mim lowers the energy level of the $t_{2g}$ orbital. The NEXAFS spectra show 22.5% $Co^+$ and 44.6% π-backbonding, suggesting that $Co(OH)_2$ SNPs are stabilized in H-ZIF-8 [1S]. The splitting of the π* transition indicates that Co is not substituted at the Zn tetrahedral site in ZIF-8, as supported by the fingerprint region of the IR spectrum, which shows the N—Zn—N stretching mode at 420 $cm^{-1}$ without the N—Co—N stretching mode at 424 $cm^{-1}$. It has been reported that the lower electron density of Co results in a shift of 0.3 eV toward higher energies relative to Zn, which is more electron dense, as observed in the case of ZIF-67 and ML-ZIFs [2L]. These observations are also supported by the absence of changes in the C 1s, N 1s, and Zn 2p XPS spectra and the Zn L-edge NEXAFS spectra.

Test Example 4

Figure 12:
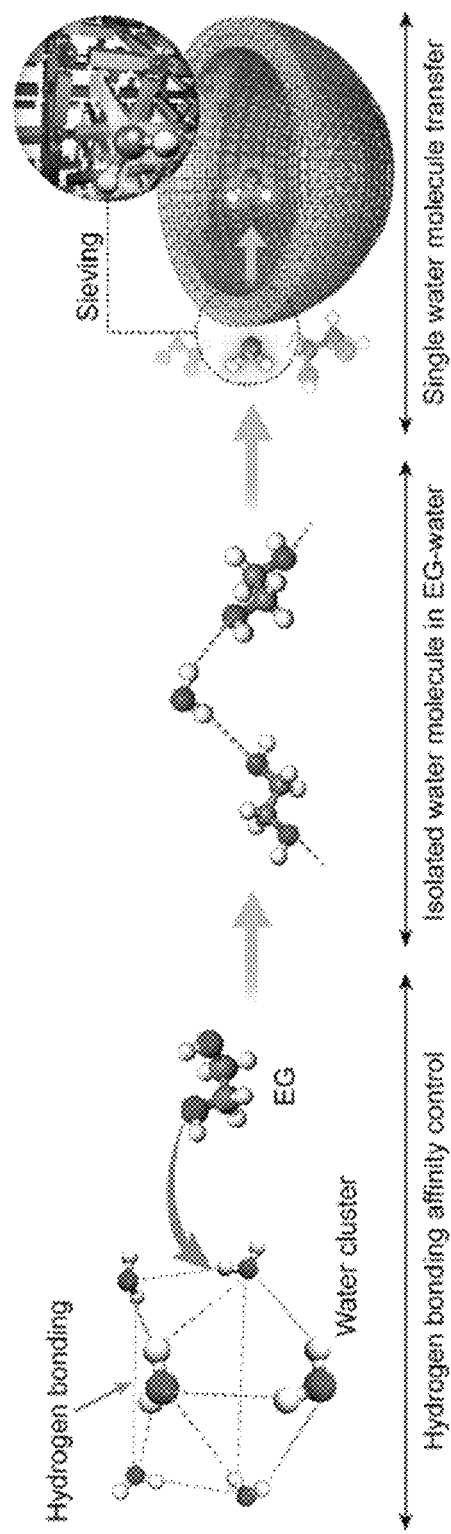
FIG. 12 is a schematic diagram illustrating the formation process of EG-water complexes and the penetration process of an isolated water molecule according to an example of the present disclosure.
Figure 13A:
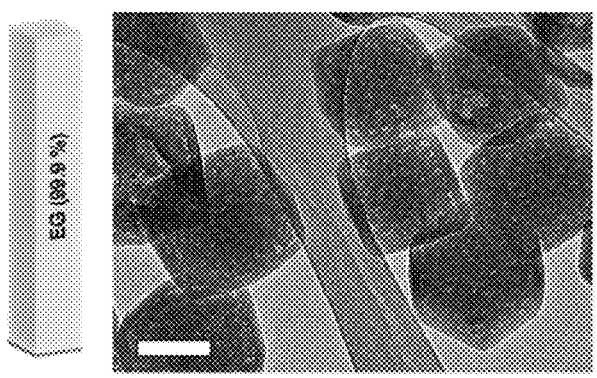
FIGS. 13A-13D provide TEM images showing structural changes of ML-ZIFs [2L] depending on transferred water volume ratio in EG-water complexes (all scale bars are 100 nm) according to an example of the present disclosure: EG 99.9% (FIG. 13A), EG 95%/water 5% (FIG. 13B), water 100% (FIG. 13C), and EG 80%/water 20% (FIG. 13D).
Figure 13B:
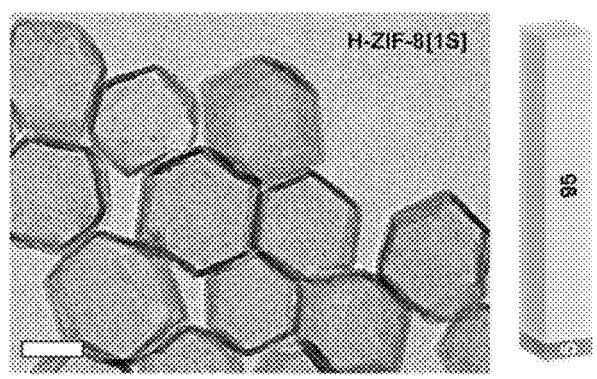
Figure 13C:
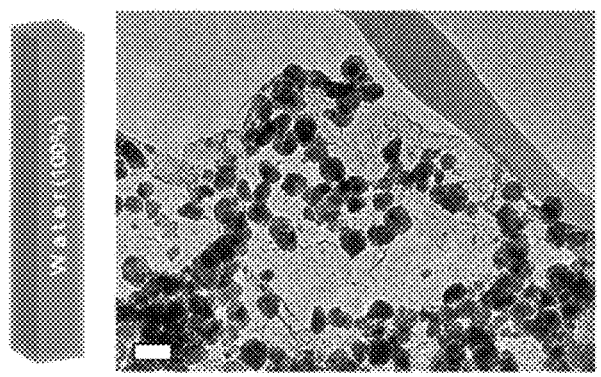
Figure 13D:
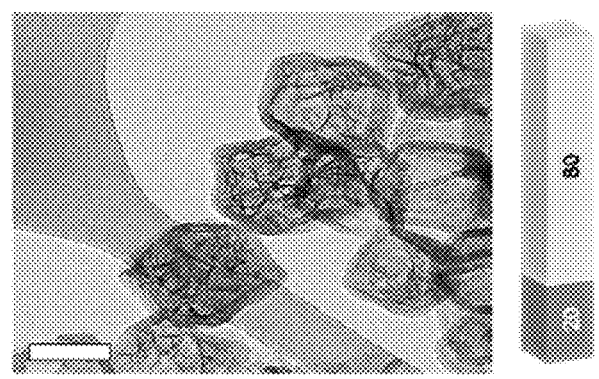

Confirmation of Isolation of Water Molecule by EG when Forming Multi-Shell Hollow MOF The transmission of isolated water molecules via controlled hydrogen bonding affinity through the micropores is the key factor in enabling the autogenous production and stabilization of SNPs within multi-shell MOFs (FIG. 12). When water clusters react without EG, H-ZIF-8 [1S] is not generated (FIG. 13C) because the water clusters are too large to pass through the ZIF-8 micropores. Solvated Co ions also do not penetrate the aperture because fully solvated Co ions are larger than the aperture. For this reason, the strong hydrogen bonding affinity between EG and water molecules was exploited to isolate water molecules and allow them to pass through the 0.34 nm micropores of ZIF-8. Using the isolation approach, exposure to relatively large or small amounts of water produces sheet-like materials similar in structure to bulk $Co(OH)_2$ or voids owing to the lack of water in ML-ZIFs [2L] (FIG. 13A, FIG. 13B, and FIG. 13D). With the optimal amount of water, the disassembled Co ions aggregate into Co ion clusters via ion-dipole interactions, as verified by the bright spots in the HAADFSTEM image during the intermediate stage. Then, Co atoms in the clusters are laminated on the inner shell surface and pass through the micropores, suppressing the growth of sheet-like structures. The limited amount of water suppresses complete hydration and regulates Co ion nucleation. Co ions are fed into the micropores prior to bulk $Co(OH)_2$ formation and then form dinuclear $Co(OH)_2$ SNPs as water molecules are supplied one by one into the micropores.

Figure 14:
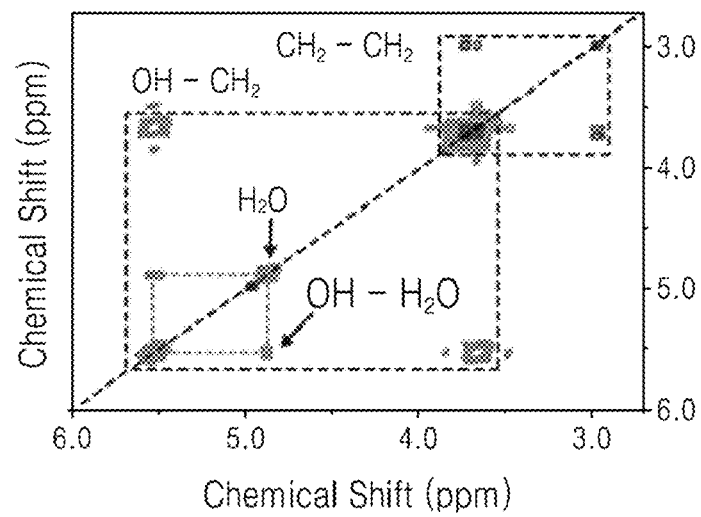
FIG. 14 is a graph showing COSY spectra showing spin-spin coupling between the photons of EG-water complexes at 258K and 318K according to an example of the present disclosure.
Figure 15:
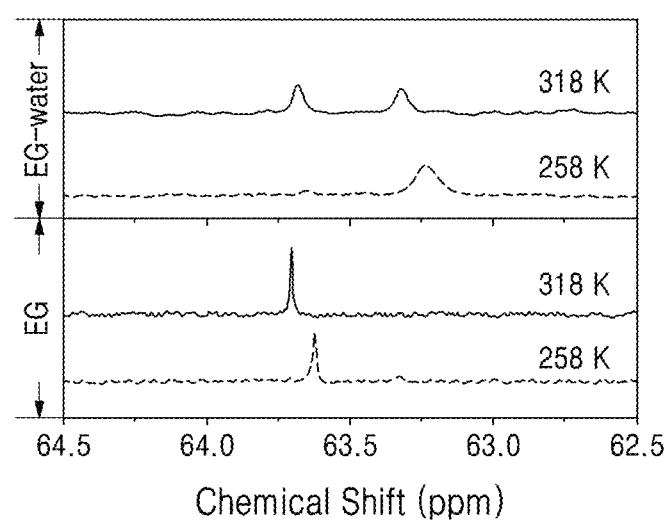
FIG. 15 is a graph showing $^{13}$C-NMR spectra of pure EG and EG-water complexes at 258K and 318K according to an example of the present disclosure.
Figure 16:
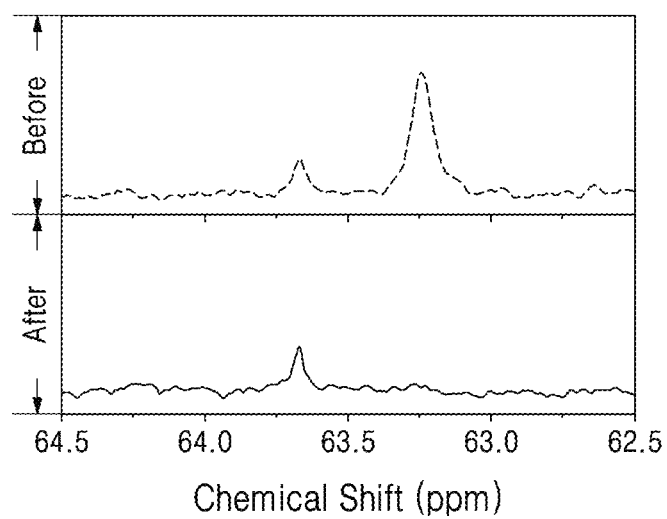
FIG. 16 is a graph showing $^{13}$C-NMR spectra of MOFs before and after water molecule transfer in EG-water complexes at 273K according to an example of the present disclosure.

To confirm the isolation of water molecules by EG, the nuclear magnetic resonance (NMR) spectroscopy was used. EG has exchangeable hydroxyl groups that are indistinguishable on the $^1$H-NMR time scale. However, a strong peak is observed at 5 ppm to 6 ppm when water molecules are added to EG. The $^1$H-$^1$H correlation spectroscopy (COSY), which can explain a spin-spin coupling between EG and water molecule, was conducted to find the reason for newly appeared peak by interpretation of the nature of the EG-water complex. The crosspeaks, denoted as "OH—$H_2O$" (FIG. 14), demonstrate that the formation of bonds between water and EG occurs via the donation of water hydrogen atoms to the oxygen of EG. The $^{13}$CNMR spectra (FIG. 15) show a broad peak at 63.3 ppm for the EG-water complex (intermolecular form), which is distinct from the sharp peak at 63.7 ppm for a pure EG (intramolecular form). It was found that the intramolecular form transforms into the intermolecular form in the presence of water molecules and water isolation proceeds effectively, as evidenced by the fixed hydroxyl group and the interaction between EG and water molecule. The two forms behave differently owing to their distinct structures. The broadness of the $^{13}$C-NMR peak originates from a slower tumbling rate owing to a large molecular size. The $^{13}$C diffusion ordered spectroscopy (DOSY) was also utilized to determine the cluster size. The diffusion coefficient calculated for the intramolecular form indicates minor interactivity, as the value is not affected significantly by the presence of water. In contrast, the value determined for the intermolecular form is approximately 20-fold higher than that for the intramolecular form, indicating that the intermolecular form behaves like a huge cluster similar to a structure of consecutively bridged water molecules. As a result of this huge EG-water cluster, the isolated water molecules come into contact with the decomposable MOFs one by one, which suppresses supersaturation of the reactants and thus avoids rapid nucleation. This approach not only makes hydrolysis controllable by regulating molecular water transfer but also effectively suppresses nucleation, resulting in the autogenous production of uniform SNPs at high mass loadings. This method can be used to synthesize multi-shell MOFs via selective detachability, even in the presence of SNPs, which has previously been difficult to implement. After water molecule transfer, the $^1$H-NMR and $^{13}$C-NMR spectra show weakening of the hydroxyl group peak and disappearance of the water and intermolecular peaks (FIG. 16), indicating that the intermolecular form returns to the original intramolecular form through reversion of the conformational changes caused by the presence of a water molecule.

Example 2

Electrochemical Performance of Sub-Nanometric Particles-Embedded Multi-Shell Hollow MOF in Li—$O_2$ Battery

2-1. Electrochemical Performance Measurement Tester

The electrochemical performance measurements were conducted using a WBCS3000L32 instrument (Won-A-Tech, Republic of Korea) as a galvanostatic cycle tester. The ink used for the working electrode was prepared by mixing H-ZIF-8, KB, and PTFE in a weight ratio of 4:5:1 with ethanol. The ink was coated to a thickness of 400 μm on CFP, which was cut into circular pieces with a 10 mm diameter. The electrode was placed in a vacuum oven and dried at 60° C. for 12 hours. After weighing, the electrode was rinsed with acetone several times and vacuum dried in a glove box at 60° C. for 12 hours. For the Li—$O_2$ battery test, a Swagelok-type cell (Wellcos, Republic of Korea) was assembled with a Li foil anode, a glass fiber filter (Whatman, GF/D) as a separator, 1 m $LiClO_4$ in TEGDME as an electrolyte, and the as-prepared working electrode. Water in TEGDME was removed using molecular sieves (3 Å) for 10 days. The assembled cell was purged with a 25 $cm^3$ $min^{-1}$ flow of pure oxygen for 3 hours at 1.1 bar. The oxygen purging pressure was maintained during the Li—$O_2$ battery test and confirmed at an outlet valve using an MP112 micromanometer (KIMO, France). The ERA measurements were conducted with a PGSTAT302N potentiostat/galvanostat (Metrohm Autolab B.V., Netherlands) using a FRA32MBA module.

2-2. Confirmation of Electrochemical Performance in Li—$O_2$ Battery

Figure 17:
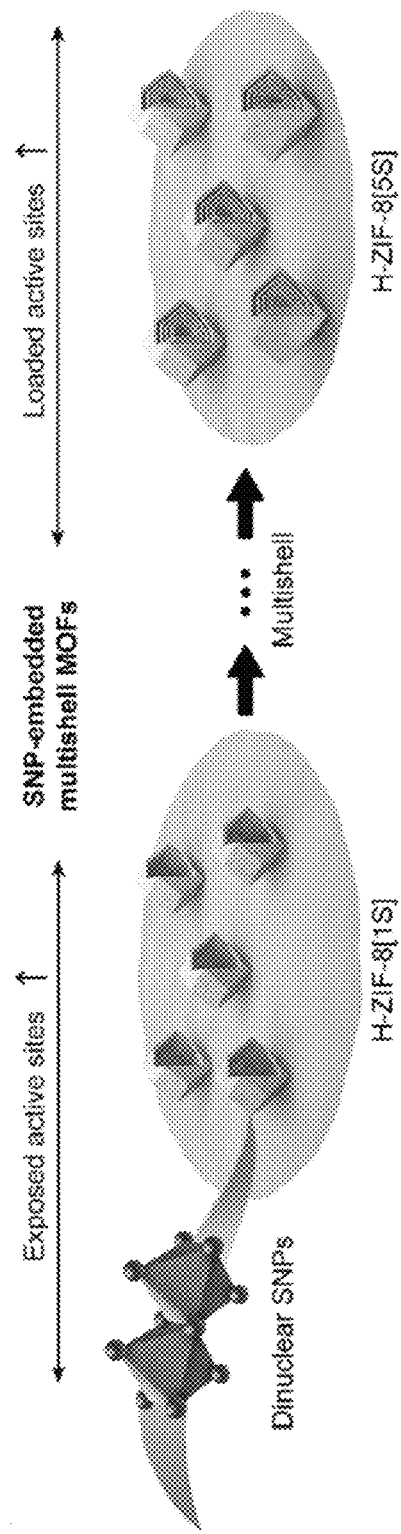
FIG. 17 is a schematic diagram illustrating a strategy to increase the active sites using dinuclear SNPs and H-ZIF-8 [nS] according to an example of the present disclosure.
Figure 18:
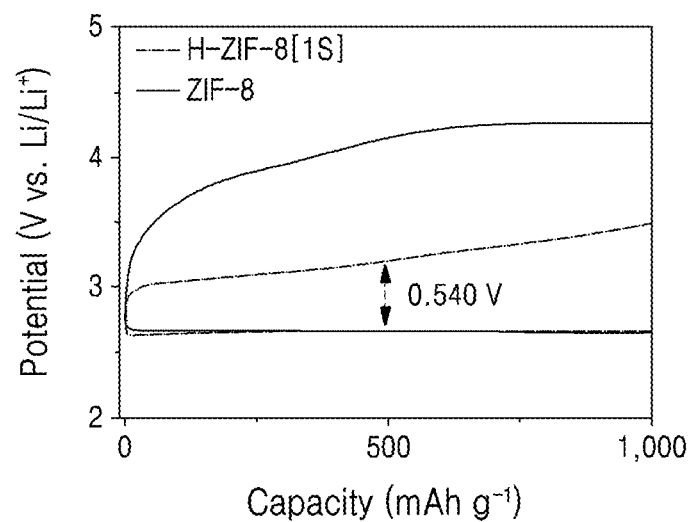
FIG. 18 is a graph showing gravimetric discharge and charge curves of H-ZIF-8 [1S] and ZIF-8 at a current density of 50 mAg$^{-1}$ with a cutoff capacity of 1000 mAhg$^{-1}$ according to an example of the present disclosure.
Figure 19:
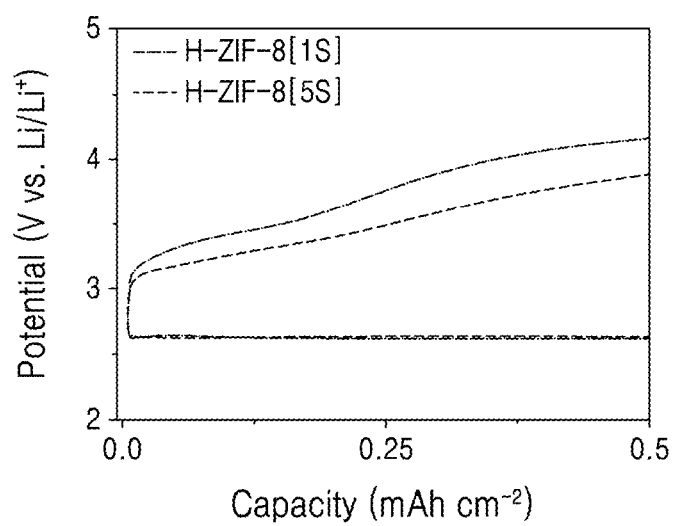
FIG. 19 is a graph showing geometric discharge and charge curves of H-ZIF-8 [1S] and H-ZIF-8 [5S] at a constant current of 0.1 mAcm$^{-2}$ with a cutoff capacity of 0.5 mAhcm$^{-2}$ according to an example of the present disclosure.
Figure 20:
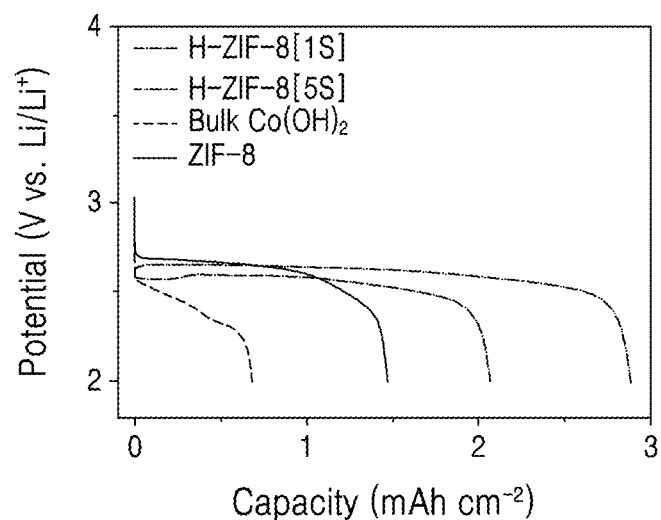
FIG. 20 is a graph showing full geometric discharge curves at a constant current density of 0.1 mAcm$^{-2}$ according to an example of the present disclosure.

There are two strategies to increase the active sites for electrocatalysis, which include i) exposing more active sites or/and ii) loading more active materials. In the present disclosure, the number of active sites was increased by increasing the exposed active sites through the synthesis of dinuclear $Co(OH)_2$ SNPs, while simultaneously loading more active materials into the multi-shell structures (FIG. 17). On the basis of the strategically-designed system, the dependence of the electrocatalytic performance of a Li—$O_2$ battery on $Co(OH)_2$ SNPs and multi-shell structures was evaluated. For pristine ZIF-8, the charging curve showed a high overpotential with a potential gap of 1.494 V at half-capacity (FIG. 18). The $Co(OH)_2$ SNPs in H-ZIF-8 [1S] remarkably improved the overpotential for the oxygen evolution reaction (OER) upon charging. The potential gap of 0.540 V at half-capacity was approximately 63.9% lower than that of pristine ZIF-8. Notably, the oxo groups between the Co ions promoted the rapid oxidization of $Co^{2+}$ to $Co^{4+}$, facilitating the OER. The $Co^{3+}$ content of 22.5% enhanced the OER kinetics by providing a shortcut to $Co^{4+}$ and more active sites. Although bulk $Co(OH)_2$ exhibited an improved overpotential, the discharge potential gradually decreased, whereas H-ZIF-8 [1S] sustained a higher voltage. This result indicates that bulk $Co(OH)_2$ is a good electrocatalyst for the OER upon charging, but unsuitable for the oxygen reduction reaction (ORR) upon discharging. Meanwhile, H-ZIF-8 [1S] not only provides a large surface area for the accumulation of the discharge product $Li_2O_2$ during the ORR, but also helps to decompose $Li_2O_2$ efficiently during the OER. The specific gravimetric capacity clarifies the importance of $Co(OH)_2$ SNPs, but a smaller amount of H-ZIF-8 [nS] is loaded as the number of shells increases at the same weight. For this reason, the specific geometric performance was utilized to determine the trend as the number of shell increases. The geometric performance shows improved overpotentials under a constant areal current density (FIG. 19), and the capacity also increases proportionally (FIG. 20).

Figure 21:
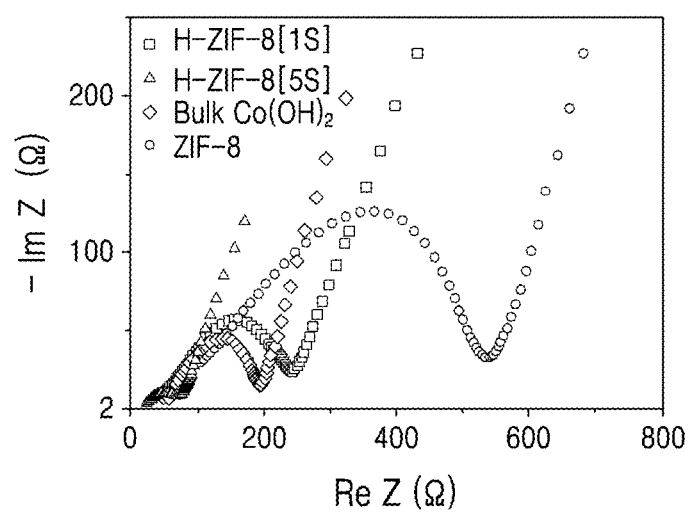
FIG. 21 is a graph showing a Nyquist plot corresponding to the EIS measurements conducted in the frequency range of from 0.1 Hz to $10^5$ Hz with an amplitude of 10 mV according to an example of the present disclosure.
Figure 22:
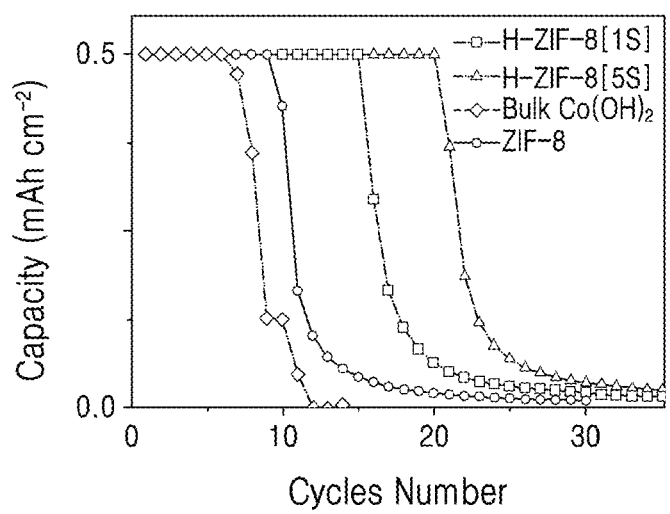
FIG. 22 is a graph showing a cyclability performance comparison at a constant current of 0.1 mAcm$^{-2}$ with a cutoff capacity of 0.5 mAhcm$^{-2}$ according to an example of the present disclosure.

To elucidate the origins for these enhancements, electrochemical impedance spectroscopy (EIS) measurements were performed. The Nyquist plot (FIG. 21) reveals two distinct changes that indicate improved performance. The charge-transfer resistance ($R_{ct}$) of H-ZIF-8 [5s] is significantly smaller than that of pristine ZIF-8, as is the solution resistance ($R_s$). The reduced $R_{ct}$ suggests that $Co(OH)_2$ SNPs enhance the poor electrical conductivity of ZIF-8 through the hopping transport mechanism. Furthermore, the reduced $R_s$ indicates that the hollow structure minimizes transport resistance, as the diffusion time is inversely proportional to the diffusion length. The n-backbonding between $Co(OH)_2$ SNPs and micropores enhances stability owing to strong adhesion. Thus, a larger amount of $Co(OH)_2$ SNPs within multi-shell ZIF-8 should give excellent cycling stability, as demonstrated by the superiority of H-ZIF-8 [5S] in Li—$O_2$ batteries (FIG. 22). Notably, excellent cycling in Li—$O_2$ batteries is also attributable to enhanced ORR and OER efficiencies.

Figure 23:
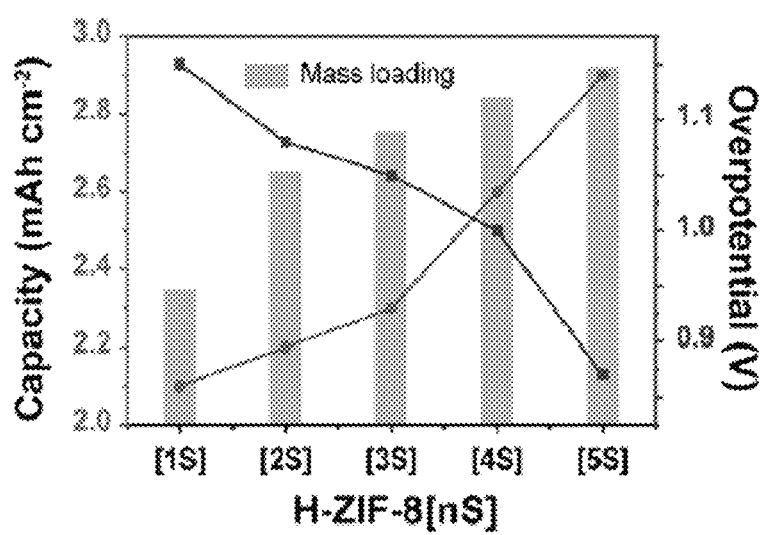
FIG. 23 is a graph showing a comparison of capacity and overpotential depending on mass loading according to an example of the present disclosure.

To investigate the structural stability of H-ZIF-8 [1S] after electrochemical reactions, the XRD patterns were compared before and after 20 cycles. The patterns were well maintained after 20 cycles, while the intensity associated with {011} facets was decreased due to the $Li_2O_2$ products of electrochemical reactions. This indicates that the structure of H-ZIF-8 [1S] is stable during electrochemical reactions. Also, FIG. 23 shows that the capacity increases and the overpotential decreases at a higher mass loading with the same electrode volume, demonstrating that the SNP-embedded multi-shell ZIF-8 allows the scalable synthesis of electrocatalysts into electrodes.

We claim:

1. A sub-nanometric particles-metal organic framework (MOF) complex, comprising:
   a hollow MOF; and
   sub-nanometric particles (SNPs),
      wherein the SNPs are embedded in pores of the hollow MOF, and
      wherein the SNPs are metals.

2. The sub-nanometric particles-MOF complex of claim 1,
   wherein the hollow MOF includes one or more MOF shells.

3. The sub-nanometric particles-MOF complex of claim 2,
   wherein a number of the MOF shells is 1 to 10.

4. The sub-nanometric particles-MOF complex of claim 1,
   wherein the hollow MOF stabilizes the SNPs by π-backbonding.

5. The sub-nanometric particles-MOF complex of claim 1,
   wherein the SNPs transport electrons through hopping transport mechanism.

6. The sub-nanometric particles-MOF complex of claim 1,
   wherein the SNPs are mononuclear SNPs.

7. The sub-nanometric particles-MOF complex of claim 1,
   wherein the hollow MOF includes at least one selected from ZIF-8, ZIF-67, MOF-74, MIL-100, UIO-66 and MOF-867.

8. The sub-nanometric particles-MOF complex of claim 1,
wherein the SNPs include at least one selected from Mg, Ca, Sr, Ba, Mn, Fe, Co, Ni, Zn, and Cd.

9. The sub-nanometric particles-MOF complex of claim 1,
wherein the SNPs are contained in an amount of 0.001 part by weight to 20 parts by weight with respect to 100 parts by weight of the sub-nanometric particles-MOF complex.

10. An energy device, comprising a sub-nanometric particles-MOF complex of claim 1.

11. The energy device of claim 10,
wherein the sub-nanometric particles-MOF complex has an improved catalytic activity by an increase in a number of active sites or an increase in a loaded amount of the SNPs, compared to a pure MOF, or by expression of both of them.

12. The energy device of claim 10,
wherein the energy device includes a lithium-air battery, a lithium-ion battery, a supercapacitor, a hydrolysis electrocatalyst or an electrocatalyst for oxygen reduction reaction.

13. The sub-nanometric particles-MOF complex of claim 1,
wherein the SNPs are dinuclear SNPs.

\* \* \* \* \*